Dec. 14, 1926.  
O. R. P. BERGLUND  
1,610,239  
RECIPROCATING ENGINE HAVING AN OSCILLATING PISTON ROD  
Filed Oct. 23, 1922    2 Sheets-Sheet 1
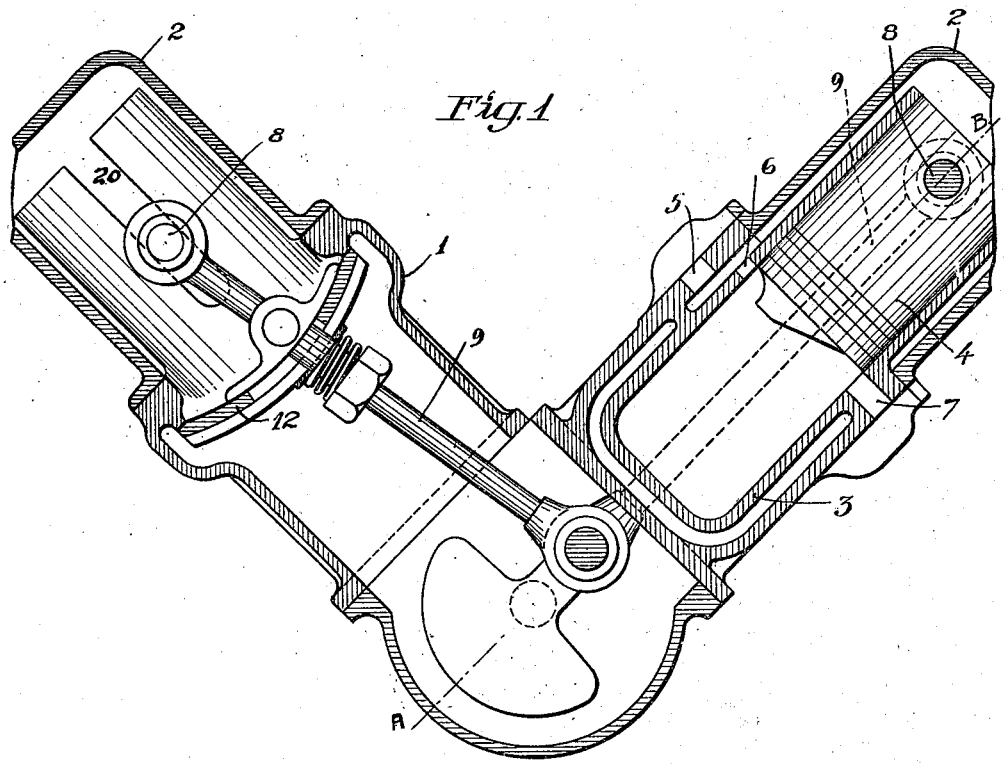
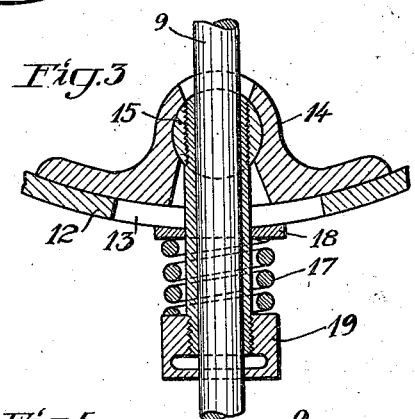
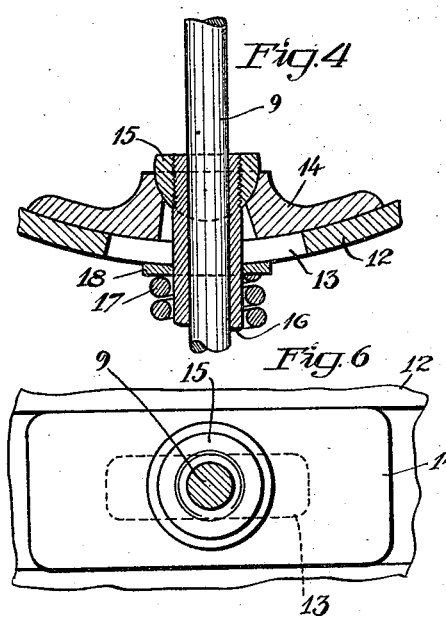
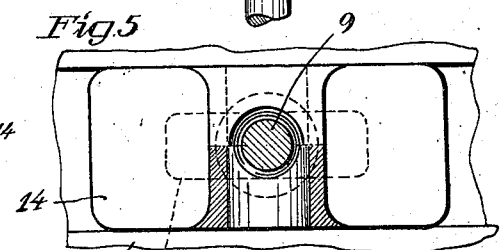

Dec. 14, 1926.

O. R. P. BERGLUND 1,610,239

RECIPROCATING ENGINE HAVING AN OSCILLATING PISTON ROD

Filed Oct. 23, 1922   2 Sheets—Sheet 2

Inventor:
O. R. P. Berglund

Patented Dec. 14, 1926.

1,610,239

UNITED STATES PATENT OFFICE.

OTTO ROBERT PERCIVAL BERGLUND, OF STOCKHOLM, SWEDEN.

RECIPROCATING ENGINE HAVING AN OSCILLATING PISTON ROD.

Application filed October 23, 1922, Serial No. 596,444, and in Sweden November 5, 1921.

The present invention refers to reciprocating engines having an oscillating piston rod, and relates more particularly to a peculiar arrangement of the piston rods. The main object of this arrangement is to facilitate the employment of comparatively long piston rods (connecting rods), without the length of the engine having to be increased thereby, and to cause the piston-pin and the inner end of the piston rod, that is to say the end clasping around the piston-pin, to be situated at a relatively great distance from the working space, so that the said parts will be heated as little as possible from the working space.

According to the embodiment shown by way of example in the accompanying drawing, the invention is adapted to a two stroke cycle internal combustion engine with two cylinders placed at an angle to each other.

Figure 2:
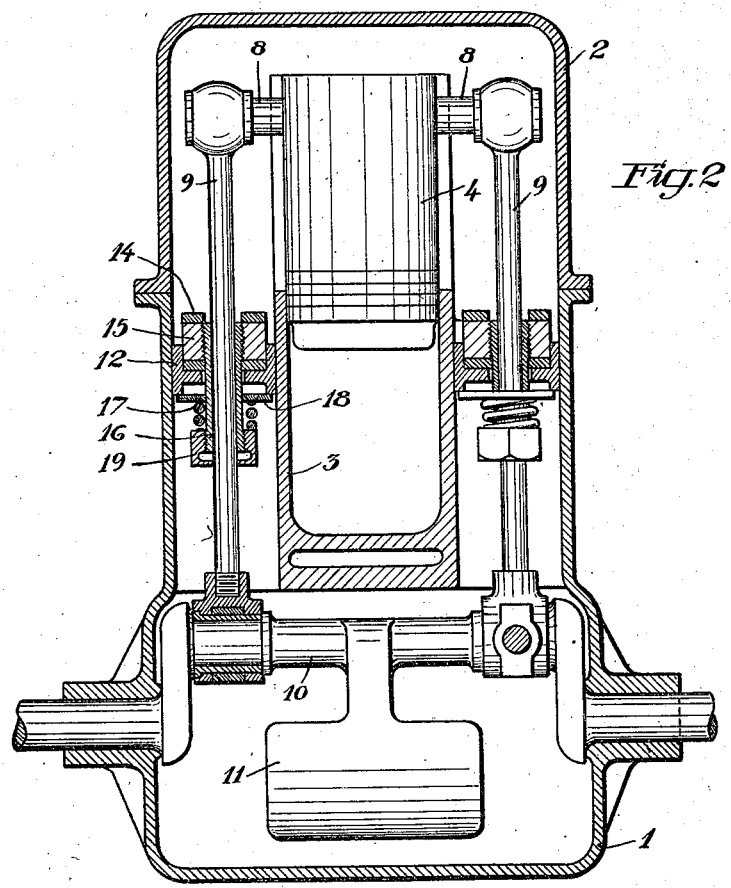
Figure 7:
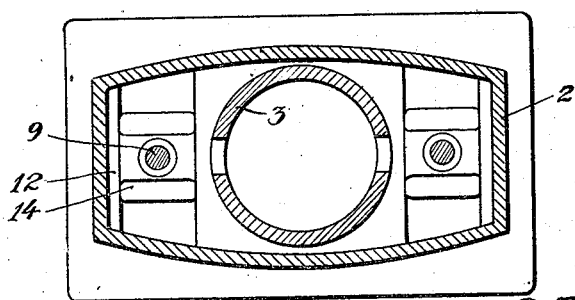

Fig. 1 is a longitudinal section of the whole motor in a plane extending transversely with respect to the driving shaft. Fig. 2 is a section on line A—B in Fig. 1. Figs. 3 and 4 show two embodiments of a detail drawn to a larger scale. Figs. 5 and 6 respectively illustrate the last-mentioned arrangements in plan views. Fig. 7 is an end view.

The casing 1 of the engine consists of two parts disposed at right angles to one another, each of said parts surrounding one of the pistons 4 with the cylinders 3 which are also arranged at right angles to each other. Arranged in the corner space between the two cylinders is the crank 10 with its balance 11. Projecting radially from two diametrically opposed sides of the outer end of the piston are two studs 8 respectively, formed preferably of the ends of an axle extending transversely through the piston. Pivotally journalled on these studs are the ends of the two piston rods 9. The opposite ends of the piston rods, serving thus also as connecting rods, clasp around the crank 10 in known manner so as to be pivotally connected therewith. The piston rods are thus disposed each on one side of the pertaining piston and cylinder on the inside of the casing.

The space 2, in which the outer end of the piston moves, is closed tightly, from the external atmosphere and from the space, the crank casing, within the casing in which the crank and the adjacent parts of the piston rods are moving, and this closing is effected by means of the partitions or covers 12 inserted between the casing 1 and the cylinder 3. These covers or partitions 12 are provided with elongated slots 13 for the piston rods extending therethrough, besides which there is provided a special slide- and tightening arrangement so devised that the said slots will be entirely closed in all positions of the respective piston rods. Thus, it is not the crank casing, but the space around the outer end of the piston, which forms the compression space in the present construction.

5 denotes the inlet for the fresh mixture to the compression space 2, and 6 designates the inlet to the cylinder, while 7 is the outlet.

As will be seen from the drawing, the working space of the cylinder is located between the piston and the crank. By this arrangement, tensile stresses in the cylinder material are avoided so that a comparatively small thickness of material may be selected.

The mode of operation is the same as in a common two stroke cycle motor. The piston on the right is shown in the extreme position to which it has been brought through the working stroke (the explosion). The exhaust gases are discharged from the cylinder through the outlet 7, and fresh combustible gas mixture, which has been compressed in the compression space 2 by the preceding outward piston stroke, enters the working space through the opening 6. At the beginning of the inward movement of the piston, the openings 6 and 7 are closed so that fresh gas mixture is sucked into the compression space 2, the gas mixture in the working space being then compressed. At the end of the stroke, the mixture is ignited, whereby the piston is again forced outwards, and the gas mixture in the compression space 2 is compressed and so forth.

The pins 8 are guided during the movement of the piston in longitudinal slots 20 provided in the cylinder.

In addition to the advantages set forth above, the further advantage is derived by the said arrangement, in comparison with the known two stroke cycle motors with an oscillating piston rod, that the use of a solid piston or of a piston closed at both ends is rendered possible without increasing the length of the motor, whereby the volume of the compression space may be selected according to the requirements.

The tightening and slide arrangement for the piston rod consists of a slide 14 bearing with a curved surface against the partition 12, which is correspondingly curved, the said slide 14 forming a bearing for a body 15 provided with cylindrical (Figs. 1–3 and 5) or with spherical (Figs. 4, 6) surfaces, the said body 15 having a sleeve 16 screwed therein, which sleeve clasps around the piston rod in direct contact therewith.

The body 15 is pressed against its seat in the slide 14, and the latter is pressed against the partition 12 under the influence of a helical spring 17 which is disposed about the sleeve 16 and inserted between a washer 18 bearing against the convex side of the partition 12 and a nut 19 screwed onto the sleeve 16.

I am aware, that the arrangement in two stroke cycle motors of an oscillating piston rod, or of a partition between the compression space and the crank casing with the oscillating piston rod extending therethrough with a tight fit, is known per se. In these known arrangements, however, the partition is plane and in its entirety formed into a slide, whereby the frictional path becomes longer and the casing must be made wider in the direction of the oscillations of the connecting rod than in the present construction. Furthermore, it is more difficult in the known construction to attain an effective tightening, without increasing the height of the cylinder.

What I claim as new and desire to secure by Letters Patent of the United States of America is:—

1. In reciprocating piston internal combustion engines, a cranked driving shaft, a cylinder, a piston therein, two oscillating piston rods located on opposite sides respectively of the cylinder and piston, and connecting the piston directly with cranks on the driving shaft, a casing forming a space which together with the piston forms the scavenging pump for the machine, said space being located at the rear end of the cylinder, while the crank chamber lies at the front end of the cylinder, partitions for tightly closing said space from communication with the crank chamber and through which the rods extend and in which they oscillate with a tight fit, said partitions having slots for the oscillating rods respectively, a slide covering each slot and yieldingly bearing against the one side of the respective partition.

2. In reciprocating piston internal combustion chambers a cylinder, a piston, operating in the cylinder, a casing, forming spaces at the front end, at the rear end and at the sides of the cylinder, the front space of the casing forming the crank chamber for a cranked driving shaft, the rear space of the casing forming together with the piston the scavenging pump for the machine, two oscillating piston rods, located in the lateral spaces of the casing and connecting directly the rear part of the piston and the cranked driving shaft, the rear space being tightly closed from communication with the crank chamber by devices, located in the lateral spaces, the oscillating rods extending through said device with a tight fit.

3. In reciprocating piston internal combustion engines, a cylinder, a piston operating in the cylinder, a crank chamber for a cranked driving shaft, said crank chamber being located at the front end of the cylinder, two oscillating piston rods located on opposite sides respectively of the cylinder and piston, and pivotally connected at their rear ends with the rear part of the piston and at their front ends with the cranks, a scavenging pump for the machine, said pump being shaped by a walled enclosure behind the cylinder in which enclosure the piston moves during the operation of the engine, partitions for tightly closing said enclosure from communication with the crank chamber, the rods extending through said partitions and being mounted to oscillate therein with a tight fit.

4. In reciprocating piston internal combustion chambers a cylinder, a piston, operating in the cylinder, a casing forming spaces at the front end, at the rear end and at the sides of the cylinder, the front space of the casing forming the crank chamber for a cranked driving shaft, the rear space of the casing forming together with the piston of the scavenging pump for the machine, two oscillating piston rods located in the lateral spaces of the casing and connecting directly the rear part of the piston and the cranked driving shaft, partitions for tightly closing said rear space from communication with the crank chamber the rods extending through and being tightly fitted for oscillation therein, said partitions having slots for the oscillating rods, a slide covering each slot and yieldingly bearing against the one side of the adjacent partition and the surface of the slide and the partition which bear against each other being arcuated.

5. In reciprocating piston internal combustion engines, a crank chamber, a cranked driving shaft therein, a cylinder, a piston in the cylinder, two oscillating piston rods located on opposite sides of the cylinder and piston and connecting the piston directly with the cranked driving shaft, an enclosure in which the piston and the rear parts of the piston rods move, said piston rods extending through and oscillating tightly in that wall of the said space, which is opposite the crank chamber, said wall having slots for the oscillating rods, a slide covering each slot and yieldingly bearing against the one side of the wall, a body with rounded bearing surfaces bearing against each slide, a sleeve provided at one end of the body and surrounding the piston rod, a head provided on one end of the sleeve, a washer bearing against the said wall on the opposite side with respect to the slide and a spring inserted between the head and washer, substantially as and for the purposes set forth.

6. In reciprocating piston internal combustion chambers a cylinder, a piston, operating in the cylinder, a casing, forming spaces at the front end, at the rear end and at the sides of the cylinder, the front space of the casing forming the crank chamber for a cranked driving shaft, the rear space of the casing forming together with the piston the scavenging pump for the machine, two oscillating piston rods, located in the lateral spaces of the casing and connecting directly the rear part of the piston and the cranked driving shaft, the rear space being tightly closed from communication with the crank chamber, said piston rods extending through and oscillating tightly in that wall of the said space, which is opposite the crank chamber, said wall having slots for the oscillating rods, a slide covering each slot and yieldingly bearing against the one side of the wall a body with rounded bearing surfaces bearing against each slide, a sleeve provided at one end of the body and surrounding the piston rod, a head provided on one end of the sleeve, a washer bearing against the said wall on the opposite side with respect to the slide and a spring inserted between the head and washer, substantially as and for the purposes set forth.

7. In reciprocating piston internal combustion engines, a cranked shaft, a cylinder, a piston therein, two oscillating rods connecting the piston and the cranks and located on opposite sides respectively of the cylinder and piston, a combustion chamber located between the piston and the cranked shaft, a tightly walled enclosure located at that end of the cylinder and the rods which is remote from the cranked shaft, the enclosure being tightly closed from communication with the space around said shaft and changing its volume in correspondence to the movement of the piston so as to form together with the latter a scavenging pump for the engine, the rods extending with a tight fit through the means, which close the said enclosure from communication with the crank chamber.

In testimony whereof I affix my signature.

OTTO ROBERT PERCIVAL BERGLUND.